Jan. 8, 1957  J. M. OLCHAWA  2,776,577
SCREW ACTUATING DEVICE
Filed Aug. 10, 1953
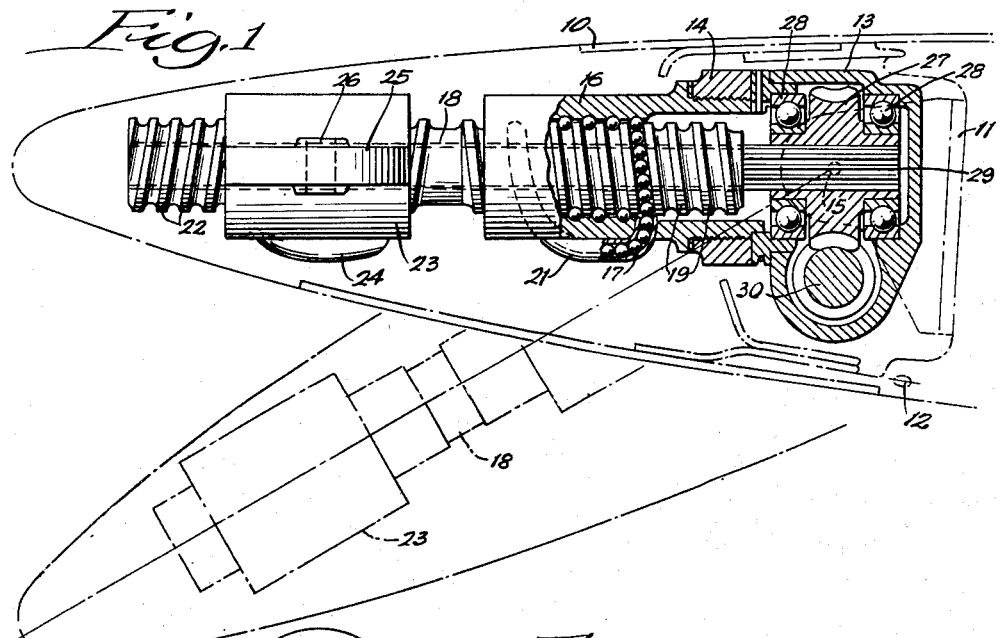
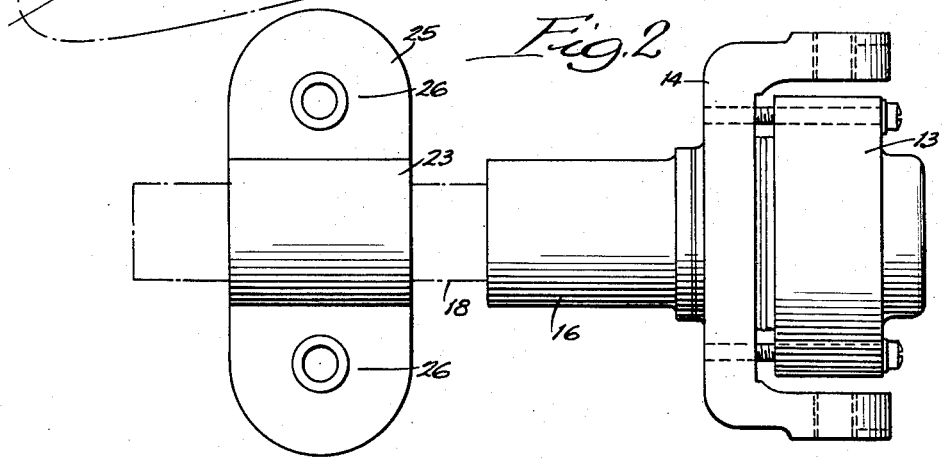
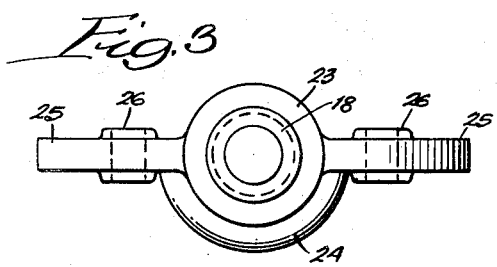
INVENTOR:
Joseph M. Olchawa,
BY
Bair, Freeman & Molinare
ATTORNEYS.

United States Patent Office 2,776,577
Patented Jan. 8, 1957

2,776,577

SCREW ACTUATING DEVICE

Joseph M. Olchawa, Chicago, Ill., assignor to Foote Bros. Gear and Machine Corporation, Chicago, Ill., a corporation of Delaware Application August 10, 1953, Serial No. 373,139

7 Claims. (Cl. 74—424.8)

This invention relates to screw actuating devices and more particularly to actuating devices for moving controlled elements such as pivoted flaps and the like on aircraft.

It has heretofore been proposed to use screw actuating devices for moving such controls and specifically to employ ball screw devices. As heretofore constructed, however, these devices have required the provision of thrust bearings to absorb the thrust on the screw, have been relatively bulky to accommodate the long screws required and have been heavy. Furthermore the ratios obtainable have been limited by the fineness or coarseness of the threads which it was practical to use.

It is one of the objects of the present invention to provide a screw actuating device which is extremely compact and which eliminates the requirement for thrust bearings.

Another object is to provide a screw actuating device in which any desired ratio can be obtained without requiring either extremely fine or extremely coarse threads.

Still another object is to provide a screw actuating device which is easily and compactly controlled to produce positive and accurate movements.

According to one feature of the invention, two nuts are employed engaging different portions of a common screw which is formed with threads of different axial pitch, the nuts being held against rotation and the screw being turned to shift the nuts axially relative to each other. The nuts are preferably connected to the screw through a series of balls to minimize friction and binding under thrust and each nut is formed with an individual ball return passage.

A further object is to provide a screw actuating device for a pivoted flap or the like in which one of the nuts is carried by a pivoted housing containing drive mechanism for the screw, and the other nut is secured in the pivoted flap which is pivoted about an axis spaced from the pivotal axis of the housing.

The above and other objects and features of the invention will be more readily apparent from the following description when read in connection with the accompanying drawing, in which:

Figure 1 is an axial section with parts in elevation through a screw actuating device embodying the invention showing the mounting thereof in a pivoted flap;

Figure 2 is a top plan view of the screw actuating device with the flap omitted;

Figure 3 is an end view looking from the left in Figure 2.

The invention is illustrated in connection with the control of a flap indicated generally at 10 which is pivoted at one edge of a main wing structure, not shown, which includes a supporting element 11, such as an edge strut. The flap is pivoted to the main wing structure for movement about a horizontal axis 12 from the position indicated in full lines to the depressed position indicated in dot-dash lines. It will be apparent that the flap could also be swung upward about the axis 12 for certain types of control.

The screw actuating device of the present invention comprises a housing 13 adapted to contain driving gearing and which is rigidly secured to a mounting yoke 14. The yoke 14 extends over the sides of the housing 13 and carries bearings in which pivot pins on the main supporting frame 11 are mounted. As seen in Figure 1, the bearings support the housing for pivotal movement about an axis 15.

The housing is open at one end and rigidly carries an elongated hollow nut 16 which is internally threaded with threads having a substantially semi-circular cross section to receive coupling balls 17. A unitary screw 18 extends through the nut 16 and is formed at one end with threads 19 adapted to lie within the nut and which are complementary to the threads on the interior of the nut. The threads of the nut and the screw threads 19 are connected through the balls 17, so that upon relatively turning the screw will move axially relative to the nut with a low friction regardless of the axial load imposed thereon. The balls are returned from one end of the nut to the other through a ball return tube 21 which may be of conventional construction.

The screw 18 is formed at its opposite end portion with threads 22 which are of different axial pitch than the threads 19. In the embodiment illustrated, the threads 19 and 22 are of reverse pitch to obtain a large axial movement per revolution of the screw, although it will be understood that any desired relationship of the thread pitches could be employed to obtain a desired ratio of movement. The threaded end 22 of the screw extends through a nut 23 which is rigidly mounted in the flap. The nut 23 is formed interiorly with threads complementary to the threads 22 and a series of balls are provided to connect the threads, the balls returning from one end of the nut to the other through a return tube indicated at 24. To mount the nut 23 in the flap, it is preferably formed with side flanged projections 25 extending laterally from the opposite sides thereof, and formed with bosses 26 by means of which the flanges may be secured in the flap.

The screw is adapted to be turned through gearing mounted in the housing shown as including a worm gear 27 supported in the housing on bearings 28 for rotation about an axis parallel to the screw axis. The screw is formed with an extension 29 which extends through the gear 27 and which is slidably splined to the gear to be turned thereby but so that it can shift axially relative to the gear. The gear is adapted to be turned by a worm 30 extending into the lower part of the housing in meshing relation with the gear. It will be understood that the worm 30 can be turned by any suitable control motor or through manual driving means in either direction to move the flap as desired.

In use, when it is desired to move the flap, the worm 30 can be turned to turn the gear 27 and through it to turn the worm 18. Assuming that the flap is in the upper full line position shown in Figure 1 and that it is to be moved to the lower dot-dash line position, the worm 30 will be turned in the appropriate direction to turn the screw 18 clockwise as viewed from the right end of Figure 1. Turning of the screw in this direction causes the right end of the screw 18 to thread outward to the left relative to the nut 16 and the left end of the screw 18 to thread to the right relative to the nut 23. Since nut 16 is supported on the pivotal axis 15 and nut 23 is secured to the free edge of the flap, a compressive force will be produced tending to increase the distance between the axis 15 and nut 23. This force acts on a line spaced from the pivotal axis 12 of the flap and creates a turning couple acting on the flap to move it about its pivotal axis 12 to the dotted line position shown in Figure 1. To move the flap in the opposite direction, the screw 18 is turned in the opposite direction to create a tensile force between the axis 15 and nut 23. This tensile force will produce a turning couple on the flap to move it clockwise about its pivotal axis 12.

It will be seen that with the construction shown the worm and gear can be made irreversible so that the flap will be positively retained in any position in which it is placed. Furthermore, where a reverse threaded screw is used as shown the movement of the flap will be magnified relative to that obtained when a single screw is employed. Greater leverage and smaller movement can obviously be obtained by designing the threads 19 and 22 to be of the same hand but of axial pitch that is different. In either case a relatively short screw can be employed so that a very compact construction results and the desired ratio of movement can be obtained with threads of a normal coarseness.

While one embodiment of the invention has been shown and described in detail, it will be understood that this is illustrative only and is not to be taken as a definition of the scope of the invention, reference being had for this purpose to the appended claims.

What is claimed is:

1. A screw actuating device comprising an elongated screw having threads of different axial pitch adjacent its opposite ends, a pair of nuts fitting on the opposite ends of the screw and formed with interval threads complementary to the threads on the ends of the screw respectively, means to hold the nuts against relative rotation but to permit relative axial movement thereof, and means to turn the screw to move the nuts axially relative to each other, axial forces between the nuts being transmitted directly through the screw so that no thrust bearings are required.

2. A screw actuating device comprising an elongated screw having threads of different axial pitch adjacent its opposite ends, a pair of nuts fitting on the opposite ends of the screw and formed with interval threads complementary to the threads on the ends of the screw respectively, a pivotally mounted housing to which one of the nuts is secured, a part movable relative to the housing to which the other nut is secured and which holds the other nut against rotation relative to said one nut, and driving means in the housing connected to the screw to turn it about its axis.

3. A screw actuating device comprising an elongated screw having threads of different axial pitch adjacent its opposite ends, a pair of nuts fitting on the opposite ends of the screw and formed with interval threads complementary to the threads on the ends of the screw respectively, a pivotally mounted housing to which one of the nuts is secured, a part movable relative to the housing to which the other nut is secured and which holds the other nut against rotation relative to said one nut, a gear rotatably mounted in the housing, an extension on the shaft projecting through and slidably splined to the gear, and drive means extending into the housing and meshing with the gear to turn it.

4. A screw actuating device comprising an elongated screw having threads of different axial pitch adjacent its opposite ends, a pair of nuts fitting on the opposite ends of the screw and formed with interval threads complementary to the threads on the ends of the screw respectively, series of balls for each of the nuts fitting between the nuts and the screw threadedly to connect them, a ball return means on each of the nuts to return the balls from one end of the nut to the other, means to hold the nuts against rotation relative to each other, and means to turn the screw to shift the nuts axially relative to each other.

5. A screw actuating device for a flap or the like pivoted on a main body comprising a housing pivoted on the main body on an axis spaced from the pivotal axis of the flap, a first nut secured to the housing, a second nut secured to the flap, an elongated screw extending through both nuts and formed with threaded portions of different axial pitch operatively meshing with the nuts respectively, and drive means in the housing connected to the screw to turn it.

6. A screw actuating device for a flap or the like pivoted on a main body comprising a housing pivoted on the main body on an axis spaced from the pivotal axis of the flap, a first nut secured to the housing, a second nut secured to the flap, an elongated screw extending through both nuts and formed with threaded portions of different axial pitch operatively meshing with the nuts respectively, a gear rotatable in the housing, an extension on the shaft projecting through and slidably splined to the gear, and a driving gear element projecting into the housing and meshing with the gear to turn it.

7. A screw actuating device for a flap or the like pivoted on a main body comprising a housing pivoted on the main body on an axis spaced from the pivotal axis of the flap, a first nut secured to the housing, a second nut secured to the flap, an elongated screw extending through both nuts and formed with threaded portions of different axial pitch operatively meshing with the nuts respectively, series of balls for each of the nuts fitting between the nuts and the screw threadedly to connect them, a ball return means on each nut to return balls from one end to the other of the nuts, and drive means in the housing connected to the screw to turn it.

No references cited